United States Patent
Rahman et al.

(10) Patent No.: US 9,650,296 B2
(45) Date of Patent: May 16, 2017

(54) NANOCLAY AS AN ADDITIVE FOR HIGH PRESSURE AND HIGH TEMPERATURE WELL CEMENTING

(71) Applicant: King Fahd University of Petroleum and Minerals, Dhahran (SA)

(72) Inventors: Muhammad Kalimur Rahman, Dhahran (SA); Mobeen Murtaza, Okara (PK); Abdulaziz Abdalla Al-Majed, Dhahran (SA); Mesfer Mohammed Al-Zahrani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/573,728

(22) Filed: Dec. 17, 2014

(65) Prior Publication Data

US 2016/0177663 A1    Jun. 23, 2016

(51) Int. Cl.
| | | |
|---|---|---|
| *C04B 14/10* | (2006.01) | |
| *E21B 33/13* | (2006.01) | |
| *C04B 16/00* | (2006.01) | |
| *C04B 24/42* | (2006.01) | |
| *C04B 28/02* | (2006.01) | |
| *C09K 8/473* | (2006.01) | |
| *C09K 8/48* | (2006.01) | |
| *C09K 8/487* | (2006.01) | |
| *C04B 103/00* | (2006.01) | |

(52) U.S. Cl.
CPC ............ *C04B 16/00* (2013.01); *C04B 24/425* (2013.01); *C04B 28/02* (2013.01); *C09K 8/473* (2013.01); *C09K 8/48* (2013.01); *C09K 8/487* (2013.01); *C04B 2103/0029* (2013.01); *C04B 2103/0035* (2013.01); *C04B 2103/0036* (2013.01)

(58) Field of Classification Search
CPC .................................. C04B 14/10; E21B 33/13
See application file for complete search history.

(56) References Cited

U.S. PATENT DOCUMENTS

| | | | | |
|---|---|---|---|---|
| 5,151,131 | A | * | 9/1992 | Burkhalter .............. C04B 24/36 106/718 |
| 7,784,542 | B2 | | 8/2010 | Roddy et al. |
| 8,586,512 | B2 | * | 11/2013 | Roddy .................. C04B 14/104 166/293 |

FOREIGN PATENT DOCUMENTS

| | | | |
|---|---|---|---|
| CN | 103130467 A | * | 6/2013 |
| CN | 103449834 A | * | 12/2013 |
| JP | 2008291225 | * | 12/2008 |
| JP | 2014181171 | * | 9/2014 |

OTHER PUBLICATIONS

Effects of organo-modified montmorillonite on strengths and permeability of cement mortars, Kuo et al., Cement and Concrete Research (2006), 36(5), 886-895.*

(Continued)

*Primary Examiner* — Paul Marcantoni
(74) *Attorney, Agent, or Firm* — Oblon, McClelland, Maier & Neustadt, L.L.P.

(57) ABSTRACT

A cement slurry composition, containing hydraulic cement, water, and from 1 to less than 4% of an organically modified nanoclay. A method for cementing a high pressure high temperature well by pumping the cement composition of claim 1 between a casing and a formation of a well bore to fill a gap between the casing and the formation, and allowing the cement to harden.

15 Claims, 8 Drawing Sheets

(56) References Cited

OTHER PUBLICATIONS

CN 103130467 A (Jun. 5, 2013) Fan et al. abstract only.*
CN 103449834 A (Dec. 18, 2013) Gu et al. abstract only.*
JP 2008291225 A (Dec. 4, 2008) Takeda et al. abstract only.*
JP 2014181171 A (Sep. 29, 2014) Yorino et al. abstract only.*
CN 103130467 A (Jun. 5, 2013) Fan et al. Machine Translation into English.*
CN 103449834 A (Dec. 18, 2013) Gu et al. Machine Translation into English.*
JP 2008291225 A (Dec. 4, 2008) Takeda et al. Machine Translation into English.*
P 2014181171 A (Sep. 29, 2014) Yorino et al. Machine Translation into English.*
Kawashima et al., "Modification of cement-based materials with nanoparticles", Cement and Concrete Composites, vol. 36, Feb. 2013, (Abstract only).

* cited by examiner

NANOCLAY AS AN ADDITIVE FOR HIGH PRESSURE AND HIGH TEMPERATURE WELL CEMENTING

BACKGROUND OF THE INVENTION

Field of the Disclosure

The present invention relates to a cement nanoclay composition and a method for cementing hydrocarbon-producing wells, under high pressure and high temperature (HPHT) conditions, using the cement and nanoclay composition. The cement-nanoclay composition comprises water, hydraulic cement, nanoclay, admixed silica flour, optionally admixed with at least one additive selected from fluid loss agent, retarder, expanding agent, friction reducing agent, density reducing agents and weighting agents.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

The increased demand for oil and gas has led to exploration of petroleum reserves into high pressure and high temperature (HPHT) zones in deeper formations. Drilling into HPHT zones requires a special design of cement slurry. Several types of additives are being investigated and used in high pressure and temperature wells to cater to the extreme environment.

Petroleum production and exploration strongly affects the global economic structure. Oil consumption increased by 171% during the period from 1965 to 2008. Over the last two decades, the amount of oil consumption per year has exceeded the amount of newly found oil reserves. With the continued growth of petroleum demand, oil and gas companies are exploring in new or unexplored areas. However, the search is proving to be extremely challenging in terms of depth, temperature and pressure. In deeper wells, high temperature and pressure and post-cementing operations put extreme stresses on the cement sheath and affect the integrity of the cement. In such conditions, the design of cement slurry is very critical and must have properties which ensures the durability and long term integrity of cement sheath.

In oil and gas wells after the well bore is completed, a pipe string is run into the well bore and the cement slurry is pumped into the annular space between the pipe casing and the formation rock in order to hold the pipe string in its place. This process is referred to as "primary cementing". The fluid cement slurry hardens as the chemical reaction involving the formation of calcium silicate hydrate (CSH), $C_3S$, $C_2S$ and $C_4AF$ takes place. The hardened cement sheath forms a layer separating the well bore formation and the casing, which is adhered firmly to the formation and the casing. The cement in the annular space holds the casing in place, and being highly impermeable, prevents the transport of corrosive fluid from the formation to the casing, thereby precluding the corrosion of the pipe string. It also provides a barrier which inhibits the migration of gases in the micro annulus between the formation and the cement and the cement and pipe casing.

Cementing in HPHT wells is complicated due to wide ranging temperature and pressure variations and stresses to which the annular cement sheath, between the casing and the formation, is subjected during its service life. The long-term integrity and durability of the annular cement depends on providing casing support and preventing the migration of formation fluid in liquid or gaseous form through or at the boundaries of the cement sheath. The zonal isolation requires a robust cement slurry design which provides a strong and durable cement-casing and cement-formation bonding, precludes bulk shrinkage by inhibiting the fluid loss, has zero free water settling of cement, and forms microannulus due to stress imbalance at the interface resulting from thermal regimes, hydraulic pressure or mechanical stresses. The hardened cement slurry should also resist radial fracturing which may result from shrinkage stresses, thermal expansion or contraction of the steel casing and pressure fluctuation, mechanical impact or other conditions within the casing. The HPHT wells have a larger probability of migration of gas and corrosive fluid and leakage. Therefore, special attention must be paid to cementing processes, especially in HPHT wells. Studies have shown that approximately 80% of the wells in the Gulf of Mexico have gas transmitted to the surface through the cement casing.

The appropriate cement slurry design for well cementing is a function of various parameters, including the well bore geometry, casing hardware, formation integrity, drilling mud characteristics, presence of spacers and washers, and mixing conditions. Communications between zones, gas migration, undesired fluid entry, strength retrogression and stresses are examples of the serious consequences resulting from poor cementing jobs in HPHT wells.

In order to ensure that the well safely produces hydrocarbons over its service life, it is necessary to ensure long-term durability of the cement composition. The cement sheath is subjected to large variations in thermal regime, stresses are generated in the cement sheath from work over activities in the well, pressure testing, production and other mechanical loadings.

The compressive and tensile strength of the cement matrix are generally considered to be indicative of the cracking in the cement and its propagation. When the tensile stress in the cement matrix exceeds the tensile strength, which is itself evolving with time, cracking will take place in the cement. Toughness of the cement matrix is an important material parameter governing the initiation and propagation of the cracks in the cement.

Cementing of HPHT wells using hydraulic cements is not feasible due to retrogression in compressive strength of the cement at temperatures exceeding 230° F. The hydrated lime released in the set cement may form alpha dicalcium silicate hydrate which results in strength retrogression of the cement. The hydrated lime may also leach out of the cement sheath resulting in deterioration of the cement matrix, and thereby enhancing the permeability which paves the way for the transport of gasses and corrosive fluids.

Permeability of the cement matrix is the key parameter which is indicative of the potential of gas migration and fluid transport in the cement. The cement in the annular space of well bore and casing undergoes a transition from a fluid phase to solid phase. It is important that the permeability of the cement during this transition and after it has achieved its full strength remains low to prevent the transport of formation fluids through the pores of the cement.

Recently, nanomaterials have demonstrated effectiveness across a variety of industries, from textiles and defense to aerospace and energy. They are now being used as commercially feasible solutions to technical challenges faced by many industries. Nanomaterials have high surface area and small size leading to beneficial properties which provides an impetus for its usage in oil and gas industry. Though nanotechnology has shown its presence in other industries throughout a few decades, its application in the oil and gas industry remains to be fully explored (Singh & Ahmed, 2010).

Development of high performance materials for construction is possible by utilizing the potential of nanotechnology. Nano-materials (being smaller in size and higher in surface area) are used in several fields, including catalysis, polymers, electronics, and bio-medical applications (Park & Road, 2004). Because of a higher surface area, these materials can also be used in oil/gas well cementing to accelerate the cement hydration process (Heinold, Dillenbeck, 2002). Due to their wide range of applications, they can help enhance final compressive strength and reduce fluid loss (Li & Wang, 2006; Campillo et al., 2007). Few literature reports are available mentioning nanomaterials in the concrete industry. For example, Campillo et al., (2007) investigated the effect of nano-alumina in belite cement. The study found that addition of nano-alumina enhances mechanical properties to some extent. Li et al., (2006) reported use of nano-$SiO_2$ or nano-$Fe_2O_3$ in cement mortar. The results showed improvement in compressive and flexural strength compared to plain cement mortar. Patil & Deshpande (2012), Senff et al. (2010) and Ershadi et al. (2011) have reported that addition of nanomaterial such as nanosilica also results in a significant increase in the compressive strength of the cement mix and prevents strength retrogression at high temperature.

Some of the examples of harnessing nanotechnology in drilling fluids (Singh & Ahmed, 2010) suggest that nanotechnology can bring revolutionary changes to additive development.

The present disclosure demonstrates that a type of nanomaterial, referred to as nanoclay, helps improve the properties of cement in oil/gas wells subjected to HPHT conditions. A well located in Saudi Arabia was selected to study the cement mixture design. Nanoclay material was added at various percentages to the Saudi Type-G Cement and the beneficial impact of nanoclay on the strength, rheological and durability properties of the cement slurry was demonstrated.

BRIEF SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

An object of the disclosure is a slurry composition, comprising cement, water, and a montmorillonite nanoclay. It is organically-modified nanoclay in which natural montmorillonite is modified with a quaternary ammonium salt.

In an embodiment the cement is admixed with at least one additive selected from the group consisting of silica flour, fluid loss control additives, retarder, expanding agent, density reducing additives, density enhancing weighting agents and friction reducing agent, and defoaming/foaming agents.

In another embodiment the composition comprises Class G cement powder, nanoclay, silica flour, expanding agent, dispersant, fluid loss control agent, retarder, and defoamer.

In one embodiment, a water to cement ratio is from 0.4 to 0.5.

Another object of the disclosure is a method for cementing a high pressure high temperature well, comprising pumping the cement composition between a casing and a formation of a well bore to fill a gap between the casing and the formation, and allowing the cement to harden.

One aspect of the disclosure is a cement composition, comprising Saudi Type-G cement and from 1 to less than 4% of organo-modified nanoclay, wherein the cement composition is in a dry form.

DETAILED DESCRIPTION

Figure 1:
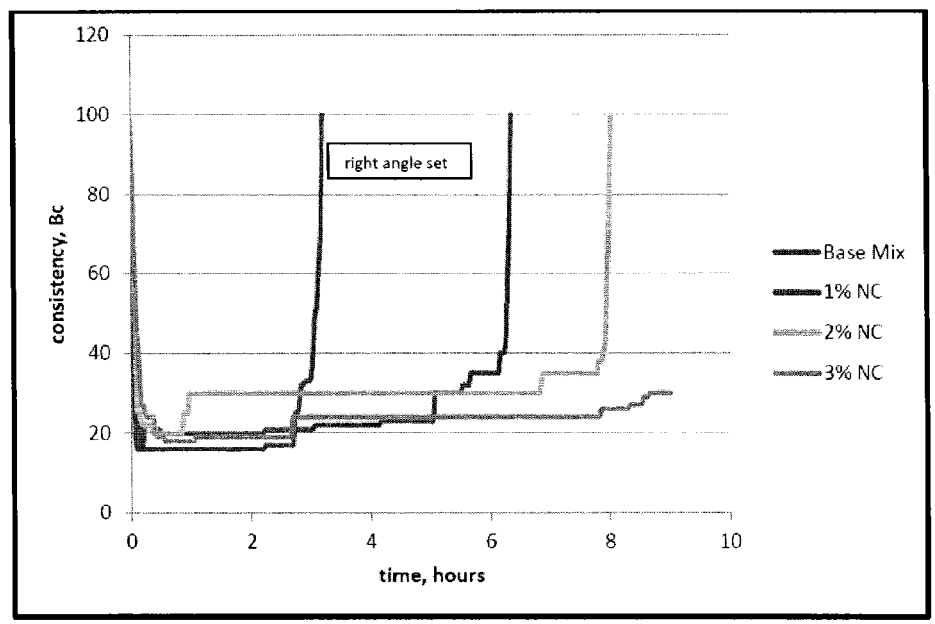
FIG. 1 is a graph showing a variation of thickening time for different concentrations of nanoclay: 0%, 1%, 2% and 3%.

The present invention relates to an oil and gas well cementing operation, more specifically, to wells under high temperature high pressure condition, using a cement slurry composition in which nanoclay is used as an additive. The nanoclay based cement slurry can be used for primary cementing and other well completion and remedial operations.

The present invention includes a slurry composition, comprising hydraulic cement, water, and from 1 to 4% of an organomodified montmorillonite based nanoclay. The cement of the composition is optionally admixed with at least one additive selected from the group consisting of silica flour, fluid loss control additives, retarder, expanding agent, density reducing additives, density enhancing weighting agents and friction reducing agent, defoaming/foaming agents and combination thereof, for application in oil and gas well cementing under high temperature and pressure conditions. Thus, the cement slurry composition may comprise Class G cement powder, nanoclay, silica flour, expanding agent, dispersant, fluid loss control agent, retarder, and defoamer. The slurry composition yields superior cement slurry properties, which include thickening time, free water separation, rheological properties, compressive strength, density, porosity and permeability.

The density of the cement composition in the present invention can range from 8 pounds per gallon (lb/gal) to about 20 lb/gal by using density reducing additives, weighting agents or other means known to those of ordinary skill in the art. For high pressure high temperature wells, a density of cement composition in excess of 16 lb/gal is generally required for generating adequate hydrostatic pressure for balancing formation pressure in a well bore.

Saudi Type-G cement as used herein is oil field cement and is referenced to American Petroleum Institute (API) classification. No additions other than calcium sulfate or water, or both, is interground or blended with the clinker during manufacture of Class G well cement. The Saudi Type-G cement of the present disclosure is preferably in the form of a dry powder. The cement powder is of moderate-sulfate-resistant grade (MSR) or high-sulfate-resistant grade (HSR). The Class-G cement comprises at least one selected from the group consisting of magnesium oxide, sulfur trioxide, tricalcium silicate, and tricalcium aluminate.

The present disclosure has found that Saudi Type-G cement admixed with different percentages of nanoclay improves the physical properties of cement slurry and helps in designing the new cement system. The nanoclay-containing cement can be advantageous for use in wells under high pressure and temperature conditions. The nanoclay based cement design can be prepared and implemented in the field without adverse effects.

Nanoclays are nanoparticles of layered mineral silicates. Depending on chemical composition and nanoparticle morphology, nanoclays are generally organized into several classes such as montmorillonite, bentonite, kaolinite, hectorite, and halloysite. Bentonite and montmorillonite clay have high expansion.

Embodiments of the cement composition of the present invention further comprises 2D nanomaterials in the form of nanolayers and nanoplates for example, bentonite in dry powder form. Bentonite is a naturally occurring nanoclay which is obtained from the deposition and alteration of volcanic ash in the sea beds, formed several million years ago. It is a fine grained material which transforms into plastic state when wet. It consists essentially of silica, alumina, and water and lesser qualities of iron, magnesium, sodium and potassium. It is composed principally of alumino-silicate materials, with particle size less than 2 to 10 microns. Bentonite contains montmorillonite, glass, illite, kaolinite, quartz, zeolite and carbonates.

The nanoclay used in the embodiment belong to the family of smectite clay, for example, montmorillonite, saporites, hectorite, bentonite and nontronite formed by mafic igneous rocks rich in $Ca^{2+}$ and $Mg^{2+}$. Weak linkages by cations $Na^+$ and $Ca^{2+}$ results in high swelling/shrinkage potential. The smectite clay is a 2:1 clay with two tetrahedral and one octahedral layer. In the octahedral layer $Al^{3+}$ is substituted by $Fe^{2+}$ and $Mg^{2+}$ and in the tetrahedral layer $Al^{3+}$ is substituted for $Si^{4+}$.

Figure 13:
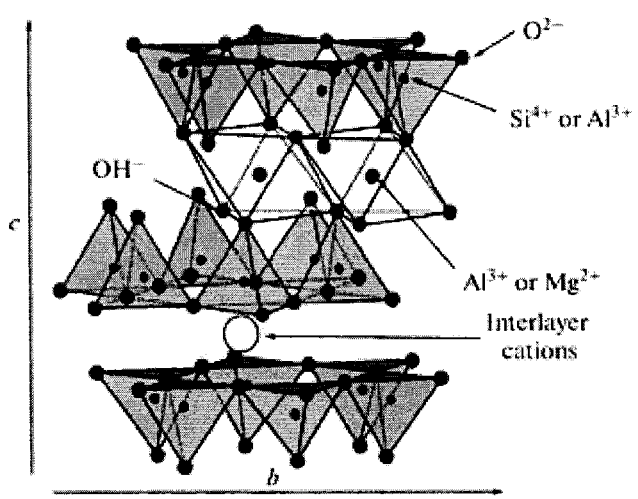
FIG. 13 is a structure of montmorillonite.

Embodiments of cement composition may consist of montmorillonite nanoclay. The montmorillonite is a natural phyllosilicate extracted from bentonite. It belongs to smectite family of an expandable 2:1 clay. Montmorillonite can expand several times its original volume, when it comes in contact with water. The layered montmorillonite comprises a layer of edge shared alumina octahedral sheet sandwiched between two silica-tetrahedral sheets. The apical oxygen atom of the silica tetrahedral sheets are all shared with the octahedral sheet (FIG. 13). The alumino-silicate layers of montmorillonite are approximately 1 nm thick with lateral dimension length/width of 200 nm. The primary particle may be from 8 nm to 10 nm in thickness. The montmorillonite in powder form has a particle size from 100 nm to 10 microns. The stacked alumino silicate sheets of montmorillonite, therefore, have a high aspect ratio and plate like morphology.

The nanoclay in the embodiment may further comprise organically modified nanoclay (organoclays) available commercially. The commercial nanoclays are treated with quaternary ammonium comprising hydrocarbons (Tallow-oil) up to 40% by weight content. Organomodified nanoclay is a class of hybrid organic inorganic nanomaterials, which has a strong potential for modifying the rheology of cement and can act as a defoamer.

The organophilization of montmorillonite clay increases the clay basal spacing and the distance between the silicate galleries. The organomodified nanoclay is used extensively in nanocomposites for automotive, aerospace and package industries and in plastics for providing mechanical reinforcement, barrier properties and flame retardant.

The nanoclay is obtained principally from bentonite by selective mining followed by purification and surface treatment. The montmorillonite based nanoclay consists of approx. 1 nm thick alumino-silicate layers, surface substituted with metal cations and stacked in approx. 10 micron size multilayer stacks.

The nanoclay used in this embodiment is derived from montmorillonite, a layered magnesium aluminum silicate that is hydrophilic in nature and is organically modified by cation exchange reaction to transform it as hydrophobic nanoclay. The nanoclay based on natural montmorillonite clay is a hydrated sodium, calcium, aluminum, and magnesium silicate hydroxide which is modified by quaternary ammonium salt.

The nanoclay in the embodiment may be commercially available, organically modified nanoclay, for example Cloisite 30B from Southern Clay Products, USA. The montmorillonite-based nanoclay is modified with methyl, Tallow (~65% C18, ~30% C16, ~5% C14), bis 2-hydroxyethyl quaternary ammonium chloride. The nanoclay in the embodiment may be white or off white in color, with a density of 1.98 $g/cm^3$, d-spacing (0011) of 1.85 nm, aspect ratio ranging from 200 to 1000, surface area of 750 $m^2/g$ and mean particle size of 6 microns.

A cement composition in accordance with the present embodiment may consists of appropriate percentages of nanoclay to achieve the mechanical properties, stability and rheological properties required for cementing the wells under HPHT conditions. For example the nanoclay may be present in cement composition in the range of 1% to 10% and in particular from 1% to 3% by weight of cement.

The organically modified hydrophobic nanoclay has multilayer stacks of plates in which the thickness of the plate may range from 0.5 nm to 1.0 nm. In certain embodiments it may have a thickness of 1 nm to 2.0 nm and in other embodiments it may have a thickness of <1 nm. These nanometer thick nanolayers may have width or length ranging from about 2 microns to 10 microns.

The cement slurry in the embodiment may use fresh water or salt water in sufficient quantity to produce a cement mix which can be easily pumped to depths up to 10,000 meters. The water to cement ratio may range from about 0.5 to 0.7. In certain embodiments it may range from 0.4 to 0.5 by weight of cement.

For HPHT cementing the cement composition in the present invention may have a host of different additives to impart properties to the cement slurry to ensure its pumpability, durability and long-term integrity. The additives may include weighting agents to impart high density required for balancing the formation pressure, silica flour or other appropriate additives to ensure that long-term strength retrogression of the cement mix is precluded under HPHT conditions, retarders, accelerators, or friction reducing agent to ensure that the slurry remains pumpable without extensive wait on cement time, fluid loss additives to ensure exclusion of gas migration and zonal isolation throughout the life of the wall and dispersants to ensure the slurry stability.

The nanoclay of the present disclosure is used for cementing oil wells under a high pressure up to 10,000 psi, preferably of from 7000 to 10,000 psi, especially preferably up to 9500 psi, at a high temperature up to 350° F., preferably of from 250 to 350° F., especially preferably up to 310° F. An amount of the nanoclay is from ≥1 to <4%, preferably from 1 to 3.5%, especially preferably from 1.5 to 3%, by weight of cement. An amount of ≥1% nanoclay yields superior results, such as longer thickening time, improvement of rheological properties, and increased gel strength and compressive strength. However, an amount of 4% or more of nanoclay results in a slurry that is thick and non-pourable. 4% or more of nanoclay requires a higher water cement ratio to achieve flowability which compromises other properties such as compressive strength.

EXAMPLE

A cement design of typical oil/gas well in Saudi Arabia was selected to test the behavior of nanoclay on cement design performance. The specifications of wells are given in Table 1.

TABLE 1

Well Specifications

| Well Parameters | Values |
| --- | --- |
| Depth of well (TVD) | 14000 ft. |
| Bottom hole circulating temperature (BHCT) | 228° F. |
| Bottom hole static temperature (BHST) | 290° F. |
| Time to reach bottom (TRB) | 49 min. |
| Surface pump pressure | 1050 psi |
| Mud weight(MW) | 85 pcf |
| Bottom hole pressure(BHP) | 8265 psi |

Cement Slurry Design

The particular well has a special cement system design since the well is deep with higher pressure and temperature conditions. The selected cement system consists of different materials in which each material plays a role in modifying the chemical and physical properties to make the cementing job successful. Table 2 explains the cement slurry design of a particular well without the addition of nanoclay.

TABLE 2

Cement Slurry Design without nanoclay

| Properties | Values |
| --- | --- |
| Slurry Density(Approx.). PCF | 125 |
| Water Cement Ratio | 0.44 |
| Slurry Yield | 1.367 |
| Thickening Time | 4-5 hours |
| Class G cement powder + 35% silica flour + 1% expanding agent + 0.8% Dispersant + 0.2% Fluid loss control agent + 0.5% Fluid loss control agent + 1% Retarder + 0.25 gm Defoamer | |

A series of tests was conducted on the above slurry design without nanoclay and is referred to as the base slurry design and used as a reference. Nanoclay was incorporated in the above cement slurry design in different percentages by weight of cement (1%, 2%, 3% and 4%) as shown in Table 3.

TABLE 3

Cement Slurry Design with nanoclay

| Properties | Values |
| --- | --- |
| Slurry Density(Approx.). PCF | Unknown |
| Water cement Ratio | 0.44 |
| Slurry Yield | Unknown |
| Thickening Time | Unknown |
| Class G cement powder + 35% silica flour + X % Nanoclay + 1% expanding agent + 0.8% Dispersant + 0.2% Fluid loss control agent + 0.5% Fluid loss control agent + 1% Retarder + 0.25 gm Defoamer | |

*X in Table 3 represents the nanoclay percentages (1%, 2%, 3% and 4%) by cement weight.

Cement Type and Additives

Saudi cement class G was used in experimental tests according to American Petroleum Standards (API-10B, 2012). Tap water was used for the slurry preparation in all experiments. A number of conventional chemical admixtures along with nanoclay were used and their effects on the properties of cement slurries were evaluated.

TABLE 4

Element Composition of Nanoclay

| Elements | Concentration |
| --- | --- |
| Si | 31.82 |
| Al | 11.82 |
| Fe | 5.84 |
| Mg | 1.04 |
| Ca | 0.42 |
| Cl | 0.58 |
| Ti | 0.12 |
| S | 0.04 |
| K | 0.04 |
| Cr | 0.02 |
| Zn | 0.02 |
| O | 48.89 |

Sample Preparation

The cement slurry preparation is very important as the shear history of the mixture influences the properties of cement (Orban et al., 1986). The cement slurries were prepared using a variable speed high-shear blender type mixer with bottom drive blades as per the API (API Specifications-10B, 2012). In all experiments, wet mixing method has been implemented in which first of all, cement, additives and water are weighted depending on the cement design. The cement, silica flour and nanoclay were blended prior to mixing with water. The liquid and dry additives which include fluid loss control additives, retarder, expanding agent, density reducing additives, density enhancing weighting agents and friction reducing agent, defoaming/foaming agents and combination thereof were first mixed in tap water at a low speed of 4000 rpm. The cement, silica flour and nanoclay dry blended mixture was subsequently added to the water and additive mixture in the blender within 15 seconds. The whole slurry was then mixed at high speed of 12000 rpm for 35 seconds. After the mixing, the cement slurry was conditioned in atmospheric consistometer at atmospheric pressure and 194° F. temperature for 20 minutes to perform other tests such as rheology, density and compressive strength.

Thickening Time Test

The thickening time of cement slurry is the period within which cement slurry remains pumpable (Dwight, 1990). The thickening time test was conducted using HPHT consistometer at 228° F. temperature and 9350 psi pressure. The cement slurry was prepared according to API Specifications and then poured into the cup and placed in HPHT consistometer and test conditions were applied as per the schedule. The test was conducted up to the time of achieving the 100 Bc consistency, the value that is the thickening time of cement slurry.

Density

The density describes the hydrostatic head of cement slurry in a well. It is measured using pressurized mud balance. First, the cement slurry was prepared according to API Specifications. The slurry was conditioned at atmospheric pressure and 194° F. temperature. Then, conditioned slurry was poured in pressurized mud balance to obtain the density.

Free Water Content Test

After the conditioning of cement slurry, the cement was poured in a graduated cylinder and kept for 2 hours. At the end of the test, a syringe was used to extract the free water separated from the cement slurry and the amount of water was measured in milliliters (ml).

Rheological Test

The rheology determines the performance of cement and helps in determining the pumpability of cement slurry. The rheological properties of the cement mix were determined using the HPHT Viscometer by Chandler at high temperature conditions. The conditioned slurry was poured into pre-heated cylinder of Viscometer at the test temperature. The Viscometer was run at different shear rates and at the end of the test, inbuilt software is used to compute the results of plastic viscosity and yield point.

Compressive Strength Test

The compressive strength properties determine the integrity of cement and its ability to bear long-term imposed stresses (Adam, 1986). There are two methods to measure the compressive strength: (1) crushing and (2) a non-destructive method.

In the crushing method, the cement slurry was prepared and filled in molds. The molds of cement were subjected to 290° F. and 3000 psi pressure for 24 hours in a HPHT curing machine. The cubes were removed from the molds and crushed to obtain compressive strength.

The compressive strength of cement was also measured by the non-destructive method by using an ultrasonic cement analyzer in which the cement slurry to be tested was placed in an autoclave unit of the ultrasonic cement analyzer (UCA) with temperature and pressure adjusted to simulate downhole conditions. An acoustic signal was then transmitted through the cement sample. As the strength of the cement increased over time, the faster the acoustic signal traveled through the sample. In this experiment, each test was conducted for 48 hours.

Porosity and Permeability Test

Permeability determines the ability of a fluid to flow at different pressure and helps in determining the long-term performance of cement. The cement sheath is supposed to seal the zones and prevent fluid migration under HTHP conditions, which is only possible if we have low permeability. The cylindrical cement cores are made from the cubes of cement cured at HPHT conditions and then permeability and porosity tests are carried out on the automated porosimeter/permeameter at 500 psi confining pressure.

Results

Two cement designs were considered as shown in Table 2 and Table 3, in which the difference between the two designs was the addition of nanoclay in various percentages 1, 2, 3 and 4% BWOC (by weight of cement) to the base mix. A dispersant percentage of 0.8% BWOC was kept constant in all mixes. Cement slurry design of 1% nanoclay was successful and gave good results. Cement slurry design with 4% nanoclay wasn't successful as the slurry produced was thick and non-pourable. The 4% nanoclay cement system requires higher water cement ratio to achieve flowability which compromises other properties such as compressive strength, evident from UCA tests conducted on the mix.

Effect of Nanoclay on Thickening Time

Four cement systems having nanoclay percentages of 0%, 1.0%, 2.0% & 3% BWOC were subjected to thickening time test and time of cement slurries to reach a consistency of 100 BC were recorded. FIG. 1 shows the results of thickening time. It is observed that addition of nanoclay results in an increase in thickening time of slurries. The addition of nanoclay slows down the hydration of cement and retards the setting time of cement slurries. For 3% nanoclay system, the slurry does not attain thickening time even after 9 hours. The addition of 1% nanoclay increases the thickening time from 3 hours for the base slurry, to six hours. The further addition of nanoclay by 2% BWOC increases the thickening time to around 8 hours. It can be observed that nanoclay acts as retarder that helps in deep well cementing by retarding the thickening time.

Effect of Nanoclay on Free Water Separation

Figure 2:
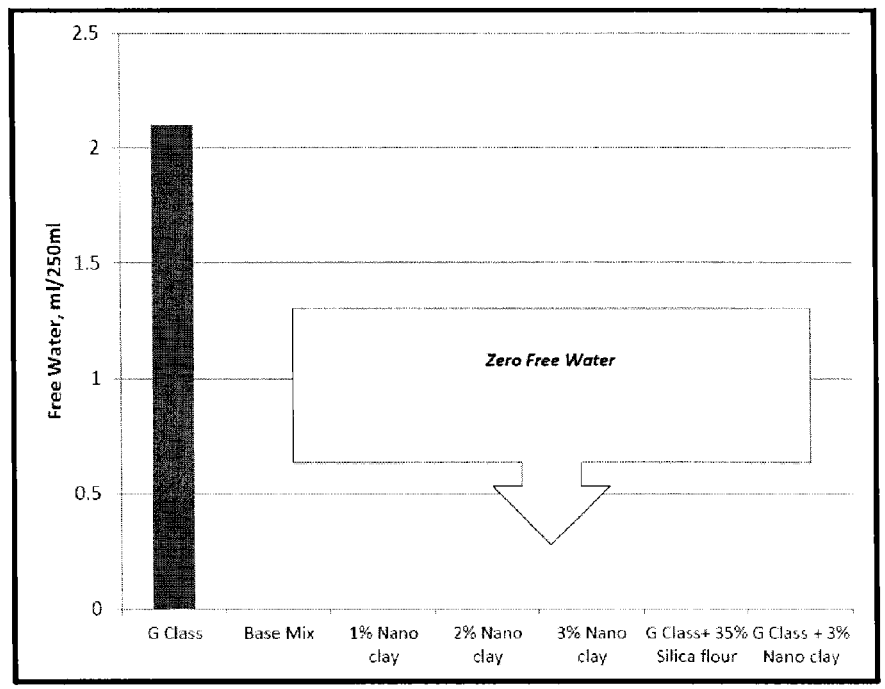
FIG. 2 is a graph showing free water content behavior for different concentrations (percentages) of nanoclay.

FIG. 2 shows that the basic Class G cement slurry shows substantial free water separation. However, when silica flour and nanoclay are mixed in cement class G with other additives, there is no free water accumulated at the top of slurry. The base mix without nanoclay shows no free water as fluid loss control agents are incorporated in the mix. The incorporation of nanoclay up to 3% does not show any change in this behavior and no bleeding or water took place.

Effect of Nanoclay on Density

Figure 3:
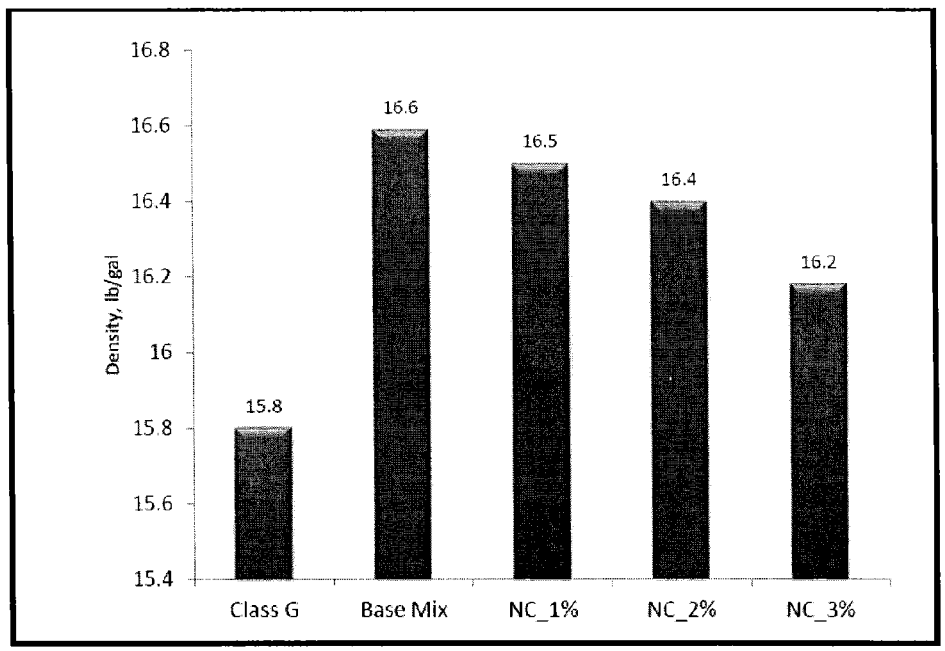
FIG. 3 is a graph showing density of cement systems with and without nanoclay.

The densities of four cement slurry systems having (0%, 1%, 2% & 3%) nanoclay percentages and Class G cement slurry is shown in FIG. 3. Class G cement slurry does not give required density to bear the pressure of deep wells at 0.44 water to cement ratio. The base mix which is the cement system without nanoclay gives the density of 16.60 lb/gal. When nanoclay is incorporated in base cement design, it decreases the density of cement slurry. But the addition of nanoclay does not reduce the density value appreciably. For example the density of cement slurry having 3% nanoclay is reduced only by 1.25% as compared to the base cement mix (0% nanoclay).

Effect of Nanoclay on Rheological Properties

Figure 4:
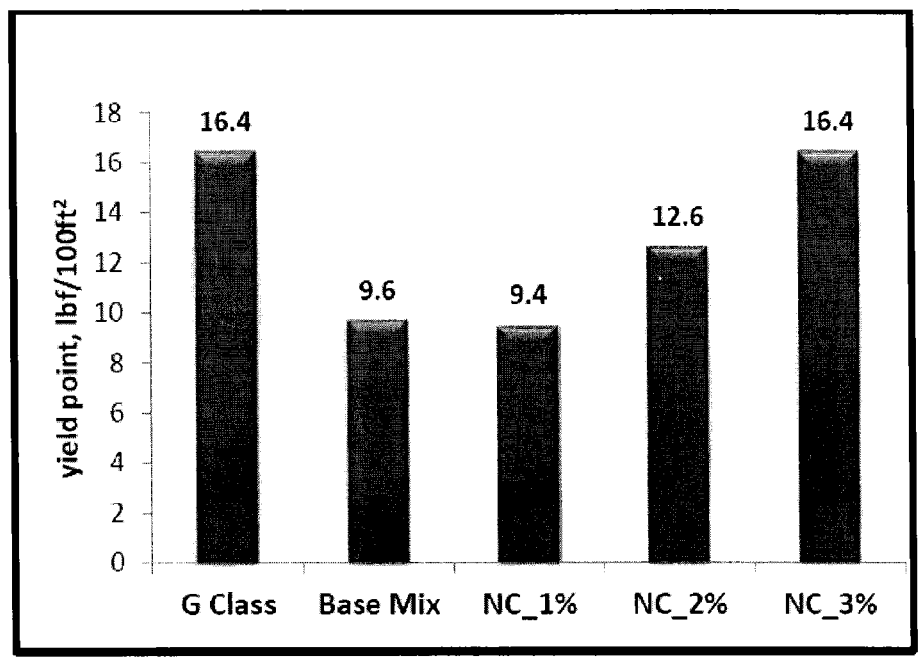
FIG. 4 is a graph showing yield point behavior.
Figure 5:
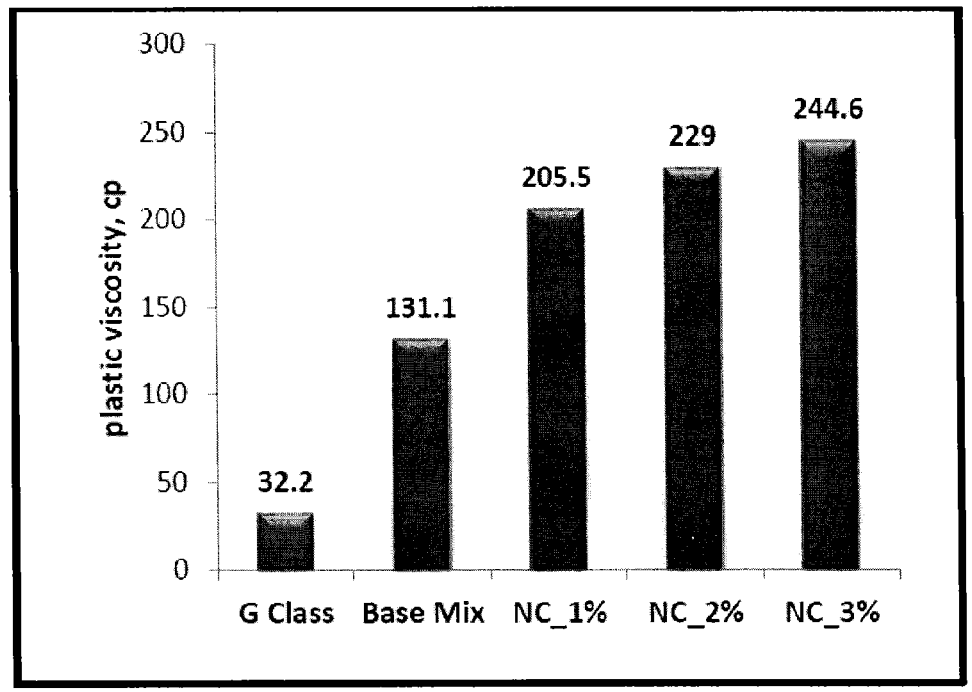
FIG. 5 is a graph showing plastic viscosity behavior.

Rheological measurements were made to determine the flow properties of the cement slurry such as plastic viscosity (PV), yield point (YP), frictional properties, gel strength, etc. Table 5 shows the plastic viscosity and yield point of five cement systems which is depicted graphically in FIGS. 4 and 5, respectively. It can be observed from these figures that the addition of nanoclay to the base slurry resulted in improvement of rheological properties (PV and YP). The increase in nanoclay percentage thickens the slurry and increases the rheological properties of cement slurry and acts as a viscosifier.

It is evident from the results that simple G class cement slurry has a low plastic viscosity and high yield strength, which cannot improve the mud displacement in these particular well conditions. Incorporation of different kinds of additives in Class G cement is needed to improve its rheological properties. The addition of nanoclay to base cement system results in an increase in the plastic viscosity of cement. The yield point is not affected significantly for 1% nanoclay, but with addition of more nanoclay (2% and 3%) the yield point increases changing from 9.5 lbf/100 ft$^2$ for the base mix to about 16.4 lbf/100 ft$^2$ for 3% nanoclay.

Effect of Nanoclay on Gel Strength

Figure 6:
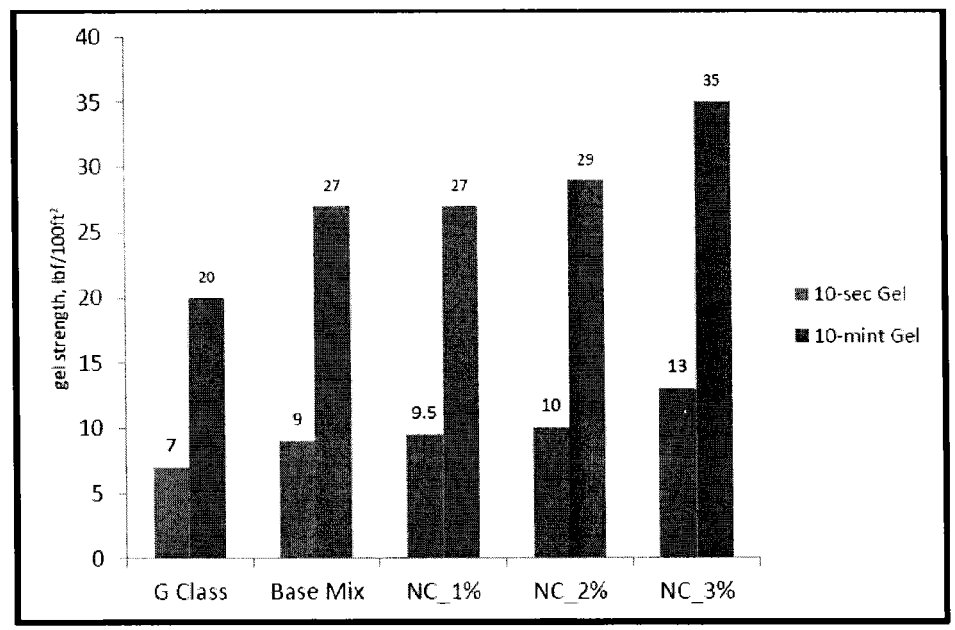
FIG. 6 is a graph showing gel strength variation for different nanoclay concentration.

Gel strength is a measure of the attractive forces in particles that cause the development of gelatin when flow is stopped. It explains the force required to initiate the flow after stopping circulation. The gel strength test was conducted on Fann Viscometer and results are provided in FIG. 6. The results show that the addition of nanoclay in the base cement mix improves the gel strength on the cement slurry. The nanoclay addition does not put noticeable effects on the initial 10-sec gel strength, for 0, 1 & 2% nanoclay cement systems. However, 3% nanoclay increases the 10-sec gel strength from 9 lbf/100 ft$^2$ to 13 lbf/100 ft$^2$. A similar trend is observed for the 10-min gel strength results as shown in FIG. 6.

Effect of Nanoclay on Compressive Strength

The compressive strength of cement system is an indicator of the integrity and stability of cement to sustain long-term imposed stresses. Cement slurry should develop the compressive strength early and make strong bonds with walls of the well after the placement, so that the drilling operations can be resumed in short time. The pumping of cement efficiently, placing it safely on time, assuring cement integrity after placement (prior to resuming drilling operation) are the issues to be considered. Therefore, compressive strength tests were conducted to evaluate the development of cement strength with time utilizing the ultrasonic cement analyzer (UCA) and to determine cement bonding stability after set utilizing the conventional compressive strength test (crushing).

Figure 7:
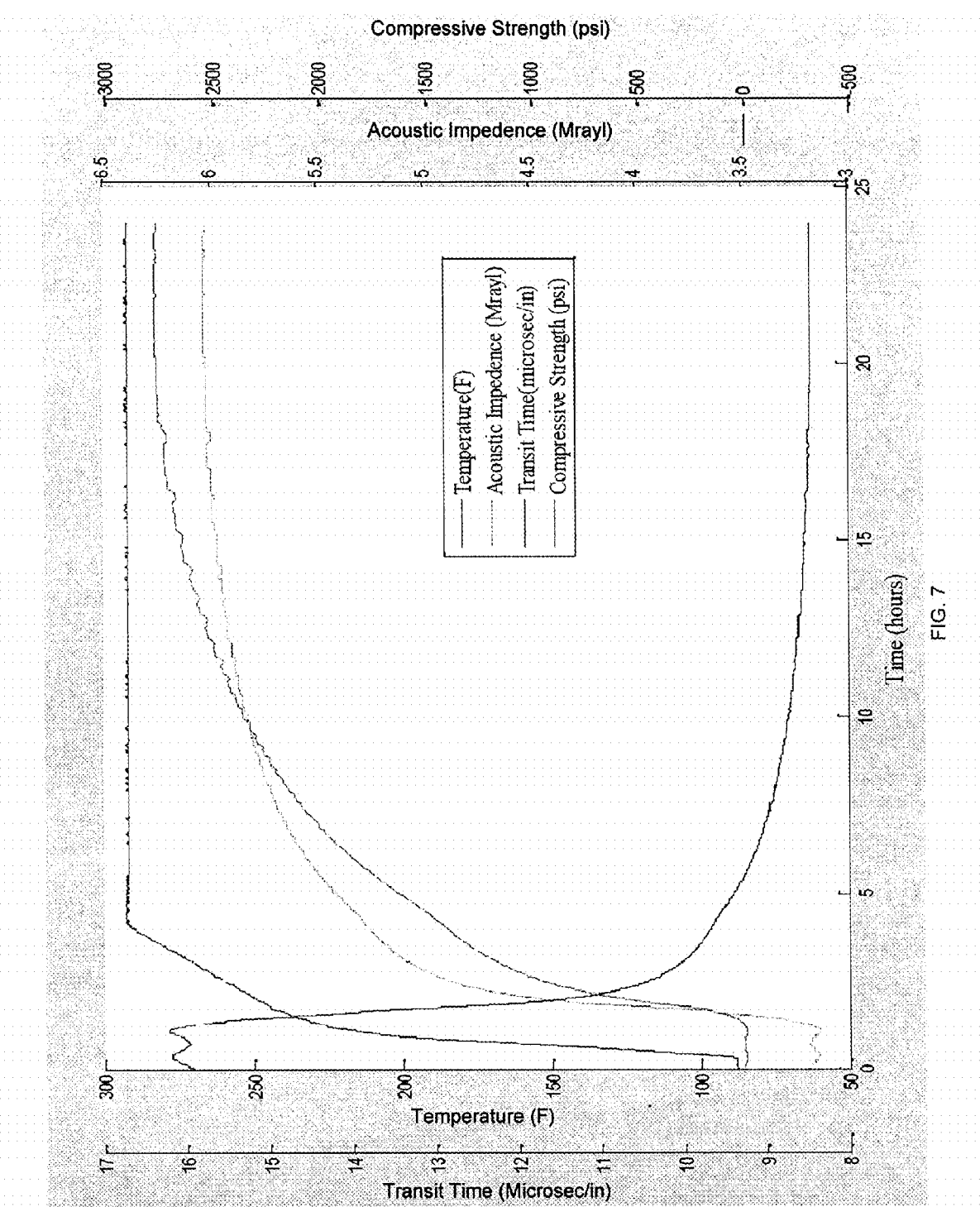
FIG. 7 is a graph showing G class cement compressive strength under UCA.

The evolution of compressive strength of the cement systems, including the base mix, mixes with 1%, 2%, 3% & 4% nanoclay and simple Class G cement was measured using the ultrasonic cement analyzer (UCA) under high temperature (290° F.) and pressure (4666 Psi) for 48 hours. FIG. 7 shows the evolution of compressive strength for plain Type-G cement slurry.

Figure 8:
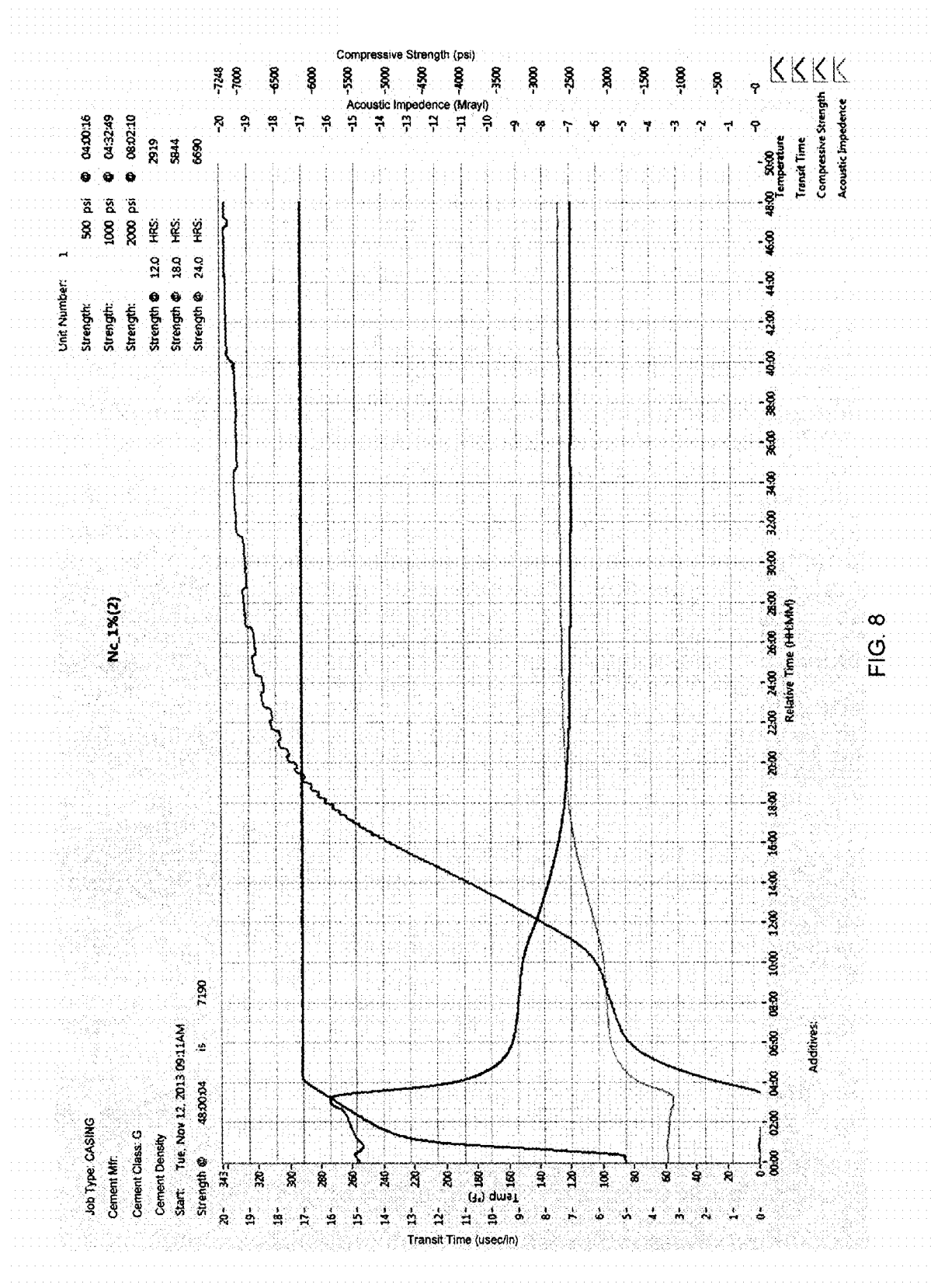
FIG. 8 is a graph showing compressive strength development of 1% nanoclay cement slurry at HPHT.
Figure 9:
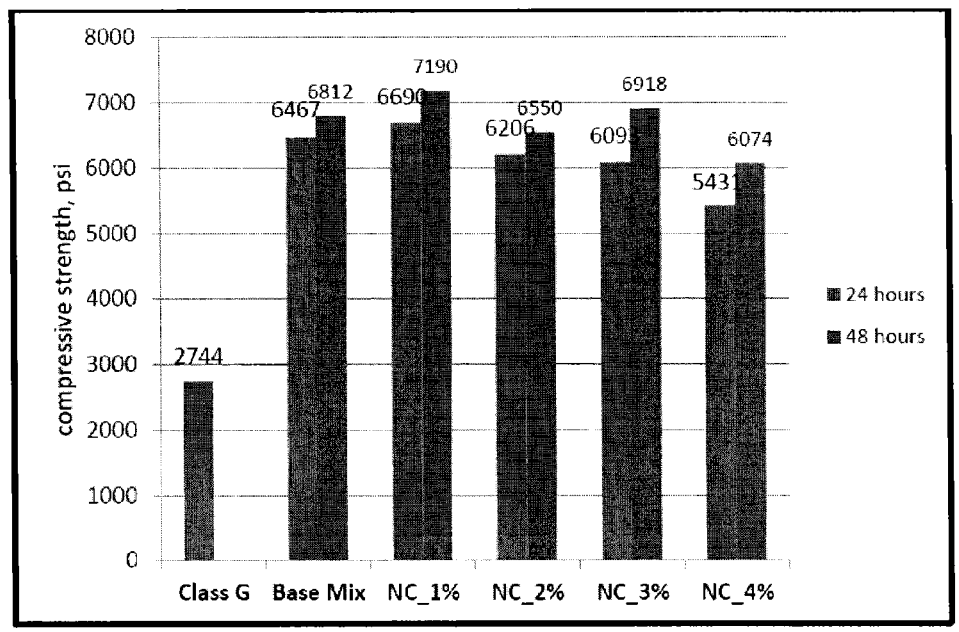
FIG. 9 is a graph showing compressive strengths at 24 and 48 hours hydration.

When simple Class G cement was subjected to high temperature and pressure conditions, the rate of compressive strength development was high initially due to fast hydration. After a maximum compressive strength of about 2500 psi, the strength started to decrease due to high temperatures in excess of 230° F. and formation of a weak porous structure, called strength retrogression. To combat strength retrogression in cement sheath and to reduce permeability at high temperature, silica flour in the range of 30%-40% was added to the Class-G cement (Iverson et al. 2010). Therefore, in base mix and mixes with nanoclay 35% BWOC silica flour was added to the cement design to combat strength retrogression at high temperature. FIG. 8 is a typical curve showing the evolution of compressive strength of cement mix with 1% nanoclay. The compressive strengths at 24 and 48 hours hydration under HPHT conditions for various mixes using UCA is shown in FIG. 9. Table 6 shows the compressive strength development at 12, 18, 24 and 48 hours after subjecting to HPHT conditions for various mixes.

TABLE 6

Compressive Strength Results (Psi) at Different Time Durations (12, 18, 24 & 48 hours)

| Time (HH:MM) | Class G | Base Mix | 1% NC | 2% NC | 3% NC | 4% NC |
| --- | --- | --- | --- | --- | --- | --- |
| 12:00 | 2487 | 2833 | 2919 | 3048 | 3749 | 3299 |
| 18:00 | 2698 | 5707 | 5844 | 5340 | 5229 | 4702 |
| 24:00 | 2744 | 6467 | 6690 | 6206 | 6093 | 5431 |
| 48:00 | — | 6812 | 7190 | 6550 | 6918 | 6074 |

It can be seen from Table 6, that the compressive strength of cement mixes with nanoclay up to 3% BWOC results in higher compressive strength as compared to the base mix at an age of 12 hours. 1% nanoclay results in significantly higher compressive strength at 24 and 48 hours as compared to the base mix. For 2% and 3% nanoclay, the compressive strength increases with time. For example for 3% nanoclay the compressive strength increases from 6093 psi at 24 hours to 6918 psi at 48 hours.

Table 7 shows the time required for cement system to develop a compressive strength of 50 psi, 500 psi and 2000 psi. These compressive strengths are considered sufficient enough to support the steel casing/liner prior to resuming the drilling operation. The transition period between developing a compressive strength of 50 psi and 500 psi is important and needed to be as short as possible to avoid long waiting time on cement before resuming drilling operation. Cement slurry of simple Class G cement has shortest time to attain the 500 psi compressive strength as it gains the strength within 2 hours which shows its ability to set early. But Class G cement alone is not a good choice to inject in HPHT wells. Cement system having nanoclay percentage of (3.0% BWOC) yielded in the shortest transition period (24 minutes) of gaining compressive strength from 50 psi to 500 psi while the cement slurry having 0, 1, 2 and 4% Nanoclay yielded on transition periods of 27, 26, 25 & 30 minutes respectively with insignificant difference.

TABLE 7

Time to Gain Compressive Strengths of 50, 500 and 2000 Psi

| Compressive: strength Psi | Class G | Base Mix | 1% NC | 2% NC | 3% NC | 4% NC |
| --- | --- | --- | --- | --- | --- | --- |
| | | | Time ( HH:MM) | | | |
| 50 | 01:25 | 03:33 | 03:34 | 03:29 | 03:40 | 03:38 |
| 500 | 01:58 | 04:00 | 04:00 | 03:54 | 04:04 | 04:08 |
| 2000 | 07:03 | 09:28 | 08:02 | 07:51 | 05:49 | 06:07 |

Time to gain 2000 psi compressive strength is important in perforations and stimulations. The cement mix with 3% nanoclay has the shortest time duration to gain 2000 psi compressive strength. The 3% nanoclay cement system has low compressive strength after 48 hours but it has advantage of gaining early compressive strengths. The base mix has a significantly higher time period to obtain 2000 psi strength as compared to the mixes with nanoclay.

Compressive Strength with Destructive Testing

Figure 10:
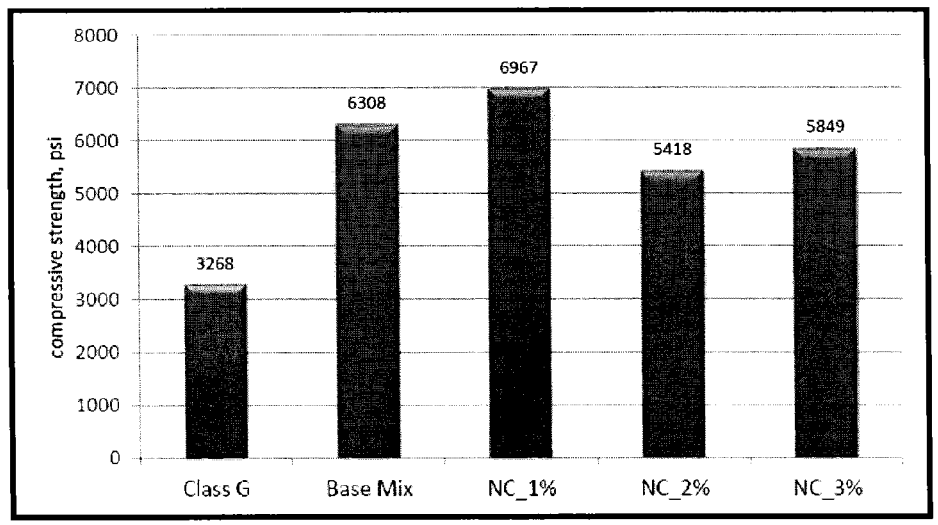
FIG. 10 is a graph showing destructive compressive strength variation with respect to different nanoclay concentrations.

FIG. 10 shows the compressive strength test results on selected cement systems by crushing cubes. From results, it is shown that a cement system having 1% nanoclay has high compressive strength as compared to other cement systems. At 2% nanoclay, the compressive strength is low as compared to base mix but 3% nanoclay results in higher compressive strength as compared to the 2% nanoclay.

Effect of Nanoclay on Permeability

Figure 11:
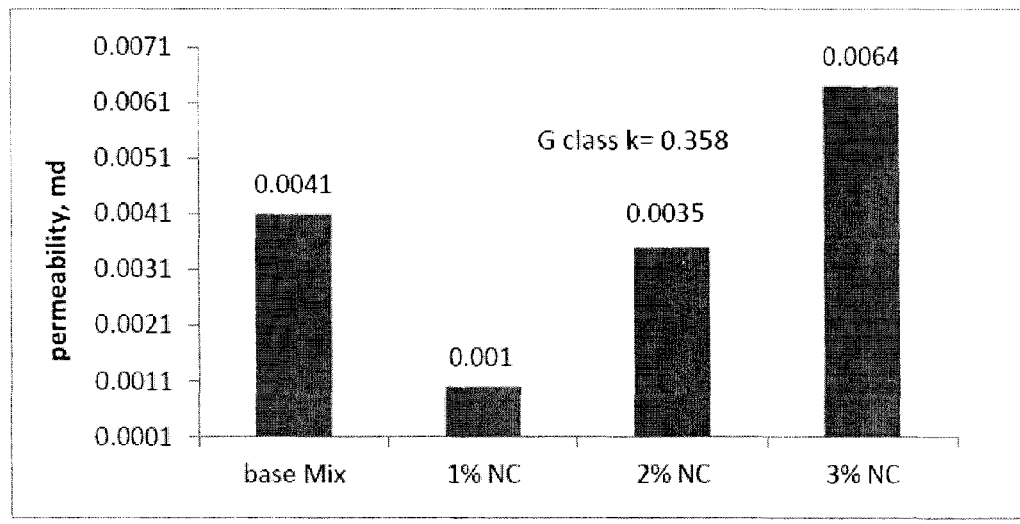
FIG. 11 is a graph showing permeability trend of nanoclay admixed slurries.
Figure 12:
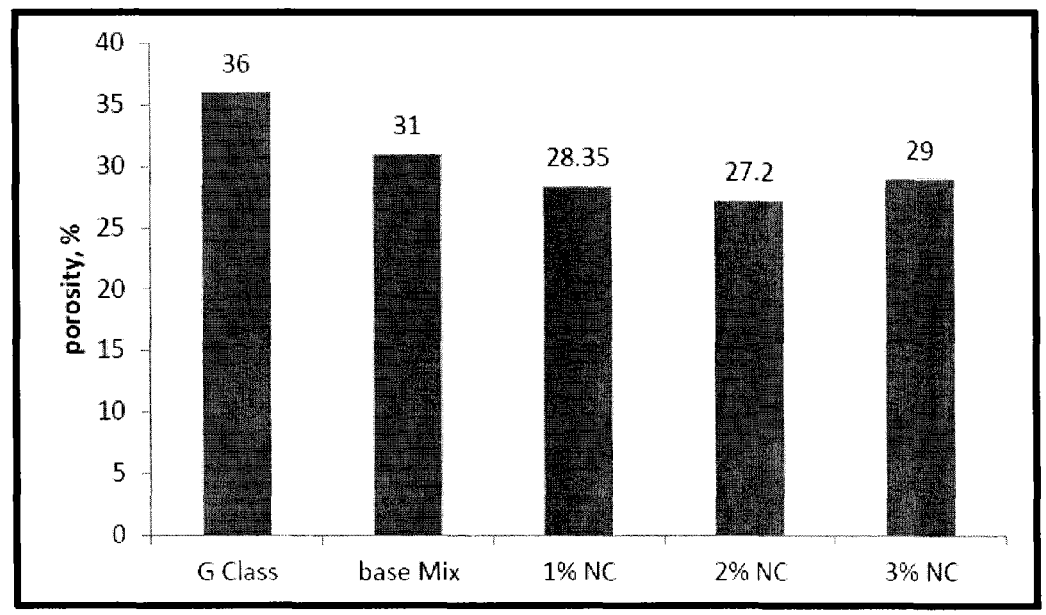
FIG. 12 is a graph showing porosity trend of nanoclay admixed slurries.

Permeability determines the ability of fluid to flow at different pressure and is important in ensuring the long term integrity of the cement sheath by preventing fluid migration. FIG. 11 and FIG. 12 show the effects of nanoclay on the permeability and porosity of cement after curing at 24 hours. When simple class G cement is subjected to high temperature and pressure conditions, it results in high porosity (36%) and permeability (0.358 md). The base mix with various admixtures for HPHT applications has low permeability and porosity. Incorporation of nanoclay in the cement mix decreases the permeability and porosity of the cement system. Addition of nanoclay by 1% BWOC results in further reduction of permeability. The permeability however, increases with 2% and 3% nanoclay. The porosity, on the other hand decreases for 1% and 2% nanoclay in the mix but increases at 3% nanoclay.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, define, in part, the scope of the foregoing claim terminology such that no inventive subject matter is dedicated to the public.

The invention claimed is:

1. A dry cement blend composition, comprising:
hydraulic cement and an organically modified nanoclay in an amount of from 1% to less than 4% by weight of the hydraulic cement,
wherein the organically modified nanoclay is a montmorillonite nanoclay formed from chlorite clay mineral having octahedral sheets, where Fe or Mg is a central cation, wherein the organically modified nanoclay is modified by a quaternary organo-ammonium salt and comprises nanolayers of less than 1 nm in thickness and about 2-10 microns in width or length.

2. The composition of claim 1, further comprising at least one additive selected from the group consisting of silica flour, an expanding agent, a dispersant, a fluid loss control agent, a retarder, a defoamer, a density reducing additive, a density enhancing weighting agent, a foaming agent, and a friction reducing agent.

3. The composition of claim 1, wherein the hydraulic cement is at least one selected from the group consisting of an API class A Portland cement, an API class H Portland cement, and an API class G Portland cement.

4. The composition of claim 1, wherein the hydraulic cement is a Saudi Type G hydraulic cement.

5. The composition of claim 1, wherein the organically modified nanoclay has a mean particle size of 6 to 10 microns.

6. A wet cement slurry composition, comprising water and the composition of claim 1, wherein a weight ratio of the water:the hydraulic cement is 0.4-0.5.

7. The composition of claim 6, which has a density of 8-20 lb/gal.

8. The composition of claim 6, which has a plastic viscosity of 131-245 CP.

9. The composition of claim 6, wherein the water is fresh water or salt water.

10. A method for cementing a high pressure high temperature well, comprising:
pumping the wet cement slurry composition of claim 6 between a casing and a formation of a well bore to fill a gap between the casing and the formation; and
allowing the cement to harden.

11. The method of claim 10, wherein the wet cement slurry composition is in contact with portions of the well, wherein a bottom hole static temperature exceeds 290° F. and a bottom hole pressure exceeds 10,000 psi.

12. The method of claim 10, wherein the wet cement slurry composition further comprises silica flour in the range of 30 to 40% by weight of the hydraulic cement.

13. The method of claim 10, wherein the water is fresh water or salt water.

14. The method of claim 10, wherein the organically modified nanoclay is surface treated with the quaternary organo-ammonium salt and has a mean particle size of 6 to 10 microns.

15. The method of claim 10, wherein a density of the wet cement slurry composition ranges from 10 lbs per gallon to about 20 lbs per gallon.

* * * * *